United States Patent [19]

Chadwick et al.

[11] Patent Number: 5,225,385

[45] Date of Patent: Jul. 6, 1993

[54] SOLID ALKENE POLYMERIZATION CATALYST COMPONENTS AND PROCESS FOR THEIR PREPARATION

[75] Inventors: John C. Chadwick; Alan Villena; Ronald P. C. Van Gaalen, all of Amsterdam, Netherlands

[73] Assignee: Shell Oil Company, Houston, Tex.

[21] Appl. No.: 892,714

[22] Filed: May 29, 1992

Related U.S. Application Data

[63] Continuation of Ser. No. 595,628, Oct. 9, 1990, abandoned, which is a continuation of Ser. No. 387,264, Jul. 31, 1989, abandoned.

[30] Foreign Application Priority Data

Aug. 26, 1988 [GB] United Kingdom ............... 8820357

[51] Int. Cl.$^5$ .................. C08F 4/651; C08F 4/653
[52] U.S. Cl. .................................. 502/127; 502/128; 526/119; 526/125
[58] Field of Search ................ 502/134, 127

[56] References Cited

U.S. PATENT DOCUMENTS

| | | | |
|---|---|---|---|
| 3,890,433 | 6/1975 | Oishi et al. ............................. | 424/37 |
| 4,069,169 | 1/1978 | Toyota et al. ......................... | 526/119 |
| 4,107,413 | 8/1978 | Giannini et al. ...................... | 526/124 |
| 4,107,414 | 8/1978 | Giannini et al. ...................... | 526/124 |
| 4,115,319 | 9/1978 | Scata et al. ........................... | 526/125 |
| 4,180,636 | 12/1979 | Hirota et al. ......................... | 526/143 |
| 4,330,649 | 5/1982 | Kioka et al. .......................... | 526/125 |
| 4,331,561 | 5/1982 | Luciani et al. .................... | 252/429 B |
| 4,393,182 | 7/1983 | Goodall et al. ...................... | 526/125 |
| 4,400,302 | 8/1983 | Goodall et al. ...................... | 526/125 |
| 4,422,957 | 12/1983 | Kaus et al. ........................... | 502/177 |
| 4,710,482 | 12/1987 | Job ........................................ | 526/125 |
| 4,728,705 | 3/1988 | Nestlerode et al. ................. | 526/124 |
| 4,780,443 | 10/1988 | Matsuura et al. .................... | 502/119 |

FOREIGN PATENT DOCUMENTS

| | | |
|---|---|---|
| 18025B | 10/1980 | European Pat. Off. . |
| 045977B | 8/1981 | European Pat. Off. . |
| 0096770 | 12/1983 | European Pat. Off. . |

*Primary Examiner*—Edward J. Smith

[57] ABSTRACT

A solid catalyst component for alkene polymerization comprising a magnesium halide, an electron donor and a phenoxy-titanium halide, the latter being a dihalophenoxy-titanium halide or a dialkoxyphenoxy-titanium halide in which the alkoxy groups each have from 1 to 8 carbon atoms.

22 Claims, No Drawings

SOLID ALKENE POLYMERIZATION CATALYST COMPONENTS AND PROCESS FOR THEIR PREPARATION

This is a continuation of application Ser. No. 595,628, filed Oct. 9, 1990, which is a continuation of Ser. No. 387,264 filed Jul. 31, 1989, both now abandoned.

BACKGROUND OF THE INVENTION

This invention relates to a solid alkene polymerization catalyst components having a reduced decay-rate.

There are numerous prior art proposals to provide alkene polymerization catalysts by combining a solid component comprising at least magnesium, titanium and halogen with an activating organoaluminium compound. These may be referred to as supported coordination catalysts or catalyst systems. The activity and stereospecific performance of such compositions is generally improved by incorporating an electron donor in the solid component and by employing as a third catalyst component an electron donor which may be complexed in whole or in part with the activating organoaluminium compound.

For convenience of reference, the solid titanium-containing constituent of such catalyst systems is referred to herein as "procatalyst", the organoaluminium compound, whether used separately or partially or totally complexed with an electron donor, as "cocatalyst", and the electron donor compound, whether used separately or partially or totally complexed with the organoaluminium compound, as "selectivity control agent" (SCA).

Supported coordination catalysts of this type are generally able to produce alkene polymers in high yield and, in the case of catalysts for polymerization of propylene or higher alkenes, with high selectivity to stereoregular polymer. However, they tend to lose their advanced polymer productivity rate after a fairly short period of time. This negative phenomenon is known as "decay", c.f. L. Luciani, Angew. Makromol. Chemie, 94 (1981), p. 63-89, FIGS. 14 and 15.

Proposals to reduce the undesirably high decay rate ar known from the prior art. EP-B 18025 relates to a slowly decaying catalyst system in which the procatalyst comprises a magnesium halide support, an electron donor and a phenoxy titanium halide. Another catalyst system having a reduced decay rate comprises a procatalyst based upon magnesium halide, titanium halide and di-isobutyl phthalate and a co-catalyst comprising trialkyl aluminium which is complexed with phenyltriethoxysilane (EP-B 45977). In the latter catalyst system the reduced decay rate is accompanied by a significant narrowing of the molecular weight distribution of the polymer. In the catalyst systems disclosed in EP-B 18025 the advantage of reduced decay rate is obtained at the detriment of a severe loss of initial polymerization rate. FIG. 1 of EP-B 18025 shows a loss of at least 50%. As a result thereof, the amount of polymer produced with a conventional prior art catalyst remains larger than that obtained with the low decay rate catalyst during a polymerization period of two hours or more under the polymerization conditions relevant to FIG. 1 of EP-B 18025.

The present invention seeks to find a solution to the aforesaid problems. It is an object of this invention to conceive catalyst systems that have in combination: a) a reduced decay rate, b) a less severe reduction of initial polymerization rate, and c) the ability to produce polymers with a wider molecular weight distribution than is obtainable with catalyst systems comprising di-esters of dihydric aromatic carboxylic acids and silane selectivity control agents.

SUMMARY OF THE INVENTION

To this purpose the present invention provides solid catalyst components for alkene polymerization comprising a magnesium halide, an electron donor and a phenoxy-titanium halide in which the latter is a dihalophenoxy- or dialkoxyphenoxy-titanium halide in which the alkoxy groups each comprise from 1 to 8 carbon atoms.

Preferred magnesium halides are magnesium dihalides, particularly magnesium dichloride. Preferred dihalophenoxy- and dialkoxyphenoxy-titanium halides are those of tetravalent titanium, particularly substituted phenoxy-titanium trihalides. Optimum performance in reducing catalyst decay rate is obtained with on the one hand 3,5-dichlorophenoxy-titanium trihalide and 2,4-dichlorophenoxy-titanium trihalide and on the other hand 3,5-dimethoxyphenoxy-titanium trihalide and 2,4-dimethoxyphenoxy-titanius trihalide. Other alkoxy substituents that may suitably be employed in the phenoxy-nucleus are ethoxy, n-propoxy, sec.-propoxy, sec.butoxy, t.butoxy and n-octoxy groups.

Suitable electron donors are in particular, aromatic esters such as ethyl and methyl benzoate, p-methoxy ethyl benzoate and p-ethoxy ethyl benzoate, dimethyl adipate, diisobutylphthalate, di-nibutyl fumarate. Ketones, phenols, amines, amides, phosphines and alcoholates can also be used as electron donors, as well as other compounds disclosed in GB-A 1389890 and GB-A 1559194.

DETAILED DESCRIPTION OF THE INVENTION

The solid catalyst components of the present invention can easily be obtained by subjecting a catalyst component known per se from, e.g. EP-B 19330 or EP-A Z36082 to ligand exchange in accordance with the reaction

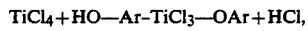
TiCl4+HO—Ar-TiCl3—OAr+HCl, in which Ar stands for dihalo- qr dialkoxy-substituted phenyl.

Alternatively, the substituted phenoxy ligand may be directly incorporated into the solid catalyst component by producing the magnesium halide support in accordance with a halogenation reaction such as:

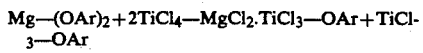
Mg—(OAr)2+2TiCl4—MgCl2.TiCl3—OAr+TiCl3—OAr in which Ar has the same meaning. By employing suitable liquid diluents in which the compound TiCl3-OPh is readily soluble, one effects a reduction of the titanium to magnesium atomic ratio in the solid catalyst components to values generally lying below 0.15 to 1.0, preferably less than 0.10 to 1.0.

A preferred process for preparing the solid catalyst components of this invention comprises the halogenation in the presence of an electron donor, a magnesium compound of the formula MgRR'.nCO2 in which n is a number of 0 to 2, R is an alkoxy or aryloxy group and R' is halogen, an alkoxy or aryloxy group, with a halide of titanium tetravalent, contacting the halogenated product with a halide of tetravalent titanium and contacting the resulting product with a dihalophenoxy-titanium halide or with a dialkoxyphenoxy-titanium halide and recovering the solid product from the reaction mixture.

Another preferred process comprises the halogenation in the presence of an electron donor, of a magnesium compound of the formula MgR"R"'.nCO$_2$ in which n is a number of from 0 to 2, R" is a dihalophenoxy or dialkoxyphenoxy group and R"' is halogen, an alkyl, aryl, dihalophenoxy or dialkoxyphenoxy group, with a halide of tetravalent titanium and recovering the solid product from the reaction mixture.

Suitable starting materials in these preferred processes, in which n in the given formulae equals 0, are halogen-containing magnesium compounds, i.e. alkoxy and aryloxy magnesium halides, such as isobutoxy magnesium chloride, ethoxy magnesium chloride, ethoxy magnesium bromide, phenoxy magnesium chloride and phenoxy magnesium bromide. Preferred magnesium compounds are selected from magnesium dialkoxides and magnesium diaryloxides. In such compounds the alkoxy groups suitably have from 1 to 8 carbon atoms, and preferably from 1 to 4 carbon atoms. Examples of these preferred groups of compounds are magnesium di-isopzopoxide, magnesium diethoxide, magnesium dibutoxide, magnesium diphenoxide, magnesium di-naphthenoxide and ethoxy magnesium isobutoxide. Magnesium diethoxide is particularly preferred. Another preferred group of starting materials are alkyl magnesium phenoxides, aryl magnesium phenoxides and magnesium diphenoxides, in all of which the phenoxy groups are dihalo- or dialkoxyphenoxy groups. Examples thereof are ethyl-magnesium-2,4-dichlorophenoxide,. n.butyl-magnesium-3,5-diethoxyphenoxide and magnesium-di-2,4-dichlorophenoxide.

Another group of preferred starting materials are magnesium compounds of the above formulae in which n does not equal zero. In such compounds the COZ is predominantly present in the form of a carbonate linkage

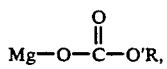

in which 'R stands for alkyl, aryl, dihalo- or dialkoxy substituted phenyl. They can be prepared by contacting a dispersion of the MgRR' or MgR"R"' compound in a suitable diluent with carbon dioxide. It is preferred that the carbon dioxide be 99.8% or more pure CO$_2$. Typically, the CO$_2$ is bubbled through the dispersion of magnesium compound in a diluent. Since the reaction is exothermic, one may continue bubbling the CO$_2$ until the exotherm has ended. During this process the mixture warms and the solid compound dissolves. By the end of the addition a turbid solution is formed. The diluent or solvent employed is any material in which the carbonated magnesium compound is soluble at desired conditions. Preferred diluents are alcohols. However, other polar solvents such as acetone or dimethyl formamide (DMF) may be used, as well as mixed solvents. Preferably, when an alcohol is employed it is used in conjunction with a magnesium compound containing two of the same groups, i.e. an alcohol of formula R'OH is used with a magnesium compound of formula Mg(OR')$_2$. For example, if magnesium diethoxide is used, then it is preferred that the diluent be ethanol. The desired magnesium compound can be recovered in solid form from the solution by spray-drying.

The temperature at which the spray-drying is effected controls, in part, the shape of the resulting particles. Typical temperatures are 40° C. to 120° C., preferably 50° to 90 ° C. for ethanol-based solutions. Preparation of spherical particles depends upon solids content of the solution and operating (spray-drying) temperature. At constant solids, too hot a temperature will result in hollow splintered particles. Too cold a temperature will give insufficient solvent removal and particle agglomeration.

In the halogenation with a halide of tetravalent titanium, the magnesium compounds are preferably reacted to form a magnesium halide in which the atomic ratio of halogen to magnesium is at least 1.2/1. Better results are obtained when the halogenation proceeds more completely, i.e. yielding magnesium halides in which the atomic ratio of halogen to magnesium is at least 1.5/1. The most preferred reactions are those leading to fully halogenated reaction products, i.e. magnesium dihalides. Such halogenation reactions are suitably effected by employing a molar ratio of magnesium compound to titanium compound of 0.0005:1 to 2:1, preferably 0.01:1 to 1:1. These halogenation reactions are conducted in the additional presence of an electron donor. An inert hydrocarbon diluent or solvent is preferably also present.

Suitable halides of tetravalent titanium include aryloxy or alkoxy-di- and trihalides, such as dihexanoxy-titanium dichloride, diethoxy-titanium dibromide, isopropoxy-titanium tri-iodide and ethoxy-titanium trichloride, and titanium tetrahalides. The tetrahalides are preferred; most preferred is titanium tetrachloride. The halogenation normally proceeds under formation of a solid reaction product which may be isolated from the liquid reaction medium by filtration, decantation or another suitable method and may be subsequently washed with an inert hydrocarbon diluent, such as n-hexane, iso-octane or toluene, to remove any unreacted material, including physically absorbed halohydrocarbon.

When a substituted phenoxy group is present in the magnesium compound that is used as starting material in the halogenation process, the resulting solid reaction product, upon recovery from the reaction mixture, may be directly utilized as solid catalyst component as defined in this invention.

When no such substituted phenoxy ligand is present in the magnesium compound used as starting material for the halogenation reaction, the solid reaction product resulting from halogenation is contacted with a halide of tetravalent titanium such as a dialkoxy-titanium dihalide, alkoxy-titanium trihalide, or titanium tetrahalide. The most preferred titanium compounds ar titanium tetrahalides and especially titanium tetrachloride. This treatment increases the content of tetravalent titanium in the solid catalyst component. This increase should preferably be sufficient to achieve a final atomic ratio of tetravalent titanium to magnesium in the solid catalyst component of from 0.005:1 to 3.0:1, particularly of from 0.02:1 to 1.0:1. To this purpose the contacting with the halide of tetravalent titanium is most suitably carried out at a temperature of from 60 ° C. to 136 ° C. for 0.1–6 hours, optionally in the presence of an inert hydrocarbon or halohydrocarhon diluent. Particularly preferred contacting temperatures are from 70 ° C. to 120° C. and the most preferred contacting periods are 0.5 to 3.5 hours. The treatment may be carried out in successive contacts of the solid with separate portions of the halide of tetravalent titanium, which may contain suitable electron donors chosen from the previous list.

In a subsequent contacting, the ligand exchange halogen substituted phenoxy is then carried out by contacting the solid reaction product which is recovered from the mixture resulting from the operations set out in the previous paragraph, with a dihalophenoxy- or dialkoxy-phenoxy-titanium halide. It is preferred to carry out the latter contacting in the presence of one of the liquid diluents listed in the previous paragraph, at temperatures of from 50° to 136 ° C. preferably from 65° to 130 ° C., for a period of from 0.1 to 3 hours. This contacting may be effected as a single step operation but successive contacting in several steps is also possible.

The preferred halogen atom, possibly contained in the magnesium compound to be halogenated, and contained in the titanium compound which serves as halogenating agent and in the halide of tetravalent titanium with which the halogenated product is contacted and in the substituted phenoxy-titanium halide is chlorine. The catalyst component is suitably washed to remove unreacted titanium compound. The titanium content of the final, washed solid catalyst component is suitably 1.5 to 3.6 percent by weight, but can be up to 4.5 percent by weight. The material used to wash the catalyst component suitably is an inert, light hydrocarbon liquid. Preferred light hydrocarbon liquids are aliphatic, alicyclic and aromatic hydrocarbons. Examples of such liquids include iso-pentane, n-hexane, iso-octane and toluene, with iso-pentane being most preferred.

For the polymerization of alkenes the solid catalyst component is employed in conjunction with a trialkyl aluminium compound and a selectivity control agent which may be any one of the electron donors set out hereinbefore. Thus, suitable electron donors are esters of carboxylic acids, particularly aromatic carboxylic acids, such as ethyl and methyl benzoate, p-methoxy ethyl benzoate, p-ethoxy methyl benzoate, p-ethoxy ethyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate and sterically hindered amines, e.g. 2,2,6,6-tetramethyl piperidine. Other suitable electron donors are organic silicon compounds including alkoxysilanes and acyloxysilanes of the general formula $R^1{}_n Si(OR^2)_{4-n}$ where n is between zero and three, $R^1$ is a hydrocarbon group or a halogen atom and $R^2$ is a hydrocarbon group. Specific examples include trimethylmethoxy silane, triphenylethoxy silane, dimethyldimethoxy silane and phenyltrimethoxy silane. The donor used as selectivity control agent in the catalyst may be the same as or different from the donor used for preparing the titanium containing constituent. Preferred selectivity control agents are p-ethoxy ethyl benzoate, phenyltriethoxy silane and diphenyldimethoxy silane.

The organoaluminium compound to be employed as cocatalyst may be chosen from any of the known activators in olefin polymerization catalyst systems comprising a titanium halide but is most suitably free of halogens. While trialkylaluminium compounds, dialkylaluminium halides and dialkylaluminium alkoxides may be used, trialkylaluminium compounds are preferred, particularly those wherein each of the alkyl groups has 2 to 6 carbon atoms, e.g. triethylaluminium, tri-n-propylaluminium, triisobutylaluminium, triisopropylaluminium and dibutyl-n-amylaluminium.

Preferred proportions of selectivity control agent, employed separately, in combination with, or reacted with an organoaluminium compound, calculated as mol per mol aluminium compound, are from 0.005 to 1.5, particularly from 0.1 to 0.8. Preferred proportions of selectivity control agent calculated as mol per mol Ti are 0.1 to 50, particularly 0.5 to 20.

Proportions of electron donor contained in the solid catalyst component, calculated as mol per mol of magnesium, are suitably from 0.01 to 10, e.g. from 0.05 to 5.0 and especially from 0.05 to 0.5.

To prepare the final polymerization catalyst composition, procatalyst, cocatalyst and selectivity control agent, if used separately, may be simply combined, most suitably employing a molar ratio to produce in the final catalyst an atomic ratio of aluminium to titanium of from 1:1 to 150:1, and suitably from 10:1 to 150:1. The catalysts of this invention tend to exhibit very good activity at much lower Al:Ti ratios, e.g. below 80:1 and even below 50:1, than prior art catalysts of the same type. It may, however, be advantageous under some conditions to employ them at higher Al:Ti ratios. Increasing the Al:Ti ratio tends to increase catalyst activity at the expense of increased catalyst residue in the unextracted product. These factors, as well as the desired level of isotacticity, will be considered in selecting the Al:Ti ratio for any given process and desired product. In general, Al:Ti atomic ratios of 30:1 to 100:1 and especially of 50:1 to 80:1 will be found advantageous.

The present invention is also concerned with a process for polymerizing an alkene, preferably a 1-alkene, such as butylene or more preferably propylene. These polymerizations may be carried out by any of the conventional techniques, such as gas phase polymerization or slurry polymerization using liquid monomer or an inert hydrocarbon diluent as liquid medium.

The performance of the catalyst systems of this invention can be further improved by effecting one or more of the following modifications in the recipe for preparing the relevant solid catalyst components, each of which modifications being known per se: 1. subjecting the solid catalyst component, at the end of its preparation process, to contacting with a carboxylic acid halide, such as benzoylchloride, 2. subjecting the solid catalyst component at the end of its preparation process to contacting with a dialkyl aluminium halide, such as diethylaluminiumchloride and 3. implementing the aforesaid halogenation reactions in the copresence of a halohydrocarbon such as chlorobenzene, dichloroethane, carbon tetrachloride or dichlorobenzene.

The invention is further illustrated by working examples.

EXAMPLES a) Magnesium-diethoxide (3.4 g) was heated under stirring with 90 ml TiCl$_4$/chlorobenzene mixture (v:v=50:50) and 1.43 ml ethylbenzoate (100° C., 1 hr). The liquid was removed by filtration while hot, and two additional treatments with TiCl$_4$/chlorobenzene were carried out (1×0.5 hr, 100° C., 1 ×0.5 hr, 110 ° C.).

b) Compounds TiCl$_3$OAr were prepared by adding 10 mmol TiCl$_4$ in a 50:50 vol. mixture with chlorobenzene to 9.5 mmol ArOH in 30 ml chlorobenzene. This mixture was kept at 80 ° C. for one hour; nitrogen was bubbled through to remove HCl. Finally, the solution was diluted with chlorobenzene (total volume: 200 ml).

c) The solid reaction product of operations a) was treated with the TiCl₃OAr/chlorobenzene solution (2×90 ml, 100° C.). After removal of the liquid, heating was stopped and the red solid was washed six times with iso-octane. This solid was employed in propylene polymerization aims set out hereinafter, after premixing with diethylaluminium chloride (DEAC) in iso-octane during 10 minutes.

d) Propylene was polymerized in a liquid bulk (propylene monomer) reaction under the following conditions: T=67° C., pressure 700 kPa, TEA/Ti molar ratio 80:1 (TEA=triethylaluminium) DEAC/Ti molar ratio 20:1 (DEAC originating from premixing), TEA/PEEB molar ratio 1.8:1 (PEEB=ethyl p-ethoxybenzoate), $H_2$ concentration 1 to 1.5% vol in gas cap.

With various compounds ArOH employed as set out under b) above, the following polymerization data marked in Table I, in terms of polymer yield (kg polymer per g cat. component) and xylene solubles (xs, % w).

TABLE I

| Period, hr | 0.3 | | 1 | | 2 | | 3 | |
|---|---|---|---|---|---|---|---|---|
| —OAr | yield | xs | yield | xs | yield | xs | yield | xs |
| Cl* | 24.4 | 4.2 | 33.4 | 4.6 | 39.5 | 4.8 | 44.7 | 5.0 |
| phenoxy** | 17.2 | 3.9 | 32.3 | 4.1 | 42.5 | 4.7 | 48.1 | 5.0 |
| 2-chlorophenoxy** | 22.4 | 4.7 | 35.9 | 4.9 | 44.1 | 5.1 | 50.5 | 5.3 |
| 2,4-dichlorophenoxy | 26.2 | 4.4 | 39.8 | 4.8 | 57:4 | 4.9 | 67.8 | 5.2 |
| 3,5-dichlorophenoxy | 24.6 | 4.6 | 45.1 | 4.7 | 58.1 | 5.1 | 68.7 | 5.6 |
| 2,4-dimethoxyphenoxy | 26.2 | 3.8 | 45.7 | 4.1 | 57.5 | 4.6 | 62.5 | 5.1 |
| 3,5-dimethoxyphenoxy | 23.5 | 3.4 | 38.5 | 3.6 | 54.1 | 4.1 | 60.8 | 4.8 |
| 2,4,6-trichlorophenoxy** | 20.4 | 3.8 | 30.3 | 4.6 | 35.3 | 5.1 | 41.5 | 5.3 |
| pentachlorophenoxy*** | 18.5 | 4.1 | 27.3 | 4.9 | 31.6 | 4.9 | 34.8 | 5.6 |

*for comparison, using the solid component obtained in operations a), thus, a product that has not been subjected to ligand exchange with ArOH.
**for comparison, outside the scope of this invention.

From the results shown in Table I it appears that the reduction of the decay rate is more pronounced with catalyst components comprising two chloro or two methoxy substituents in the phenoxy ligand as compared with that of catalyst components in which the number of substituents in the phenoxy ligand is 0, 1, 3, or 5. For this surprising finding the Applicants can offer no explanation.

By monitoring the polymerization rate in each run the "break-even' point was determined, i.e. the moment at which the reduction in polymerization rate obtained with phenoxy ligand catalyst components, relative to that of the non-exchanged catalyst component, is zero. As from that moment the reduction becomes negative.

The following break-even points were found (in min.)

TABLE II

| phenoxy | 105 |
|---|---|
| 2-chlorophenoxy | 50 |
| 3,5-dichlorophenoxy | 24 |
| 3,5-dimethoxyphenoxy | 30 |
| 2,4,6-trichlorophenoxy | 5 |
| pentachlorophenoxy | 5 |

Also the latter data clearly show the surprising performance of di-substituted phenoxy ligands relative to that of phenoxy ligands having no, one, three or five substituents.

We claim:

1. A solid catalyst component for alkene polymerization prepared by a process comprising:

(a) contacting a magnesium compound of the formula $$MgRR'.nCO_2$$

wherein R is alkoxy or aryloxy, R' is halogen, alkoxy or aryloxy, and n is a number from 0 to 2, with titanium tetrachloride in a halohydrocarbon diluent in the presence of an aromatic ester electron donor to produce a halogenated product;

(b) contacting said halogenated product with a halide of tetravalent titanium; and (c) contacting the product of step (b) with TiCl₃—Oar where Ar is dihalophenyl or dialkoxyphenyl.

2. The catalyst component of claim 1 wherein n is 0.

3. The catalyst component of claim 2 wherein R and R' are alkoxy of up to 8 carbon atoms.

4. The catalyst component of claim 3 wherein the aromatic ester is ethyl benzoate, methyl benzoate, ethyl p-methoxybenzoate or diisobutyl phthalate.

5. The catalyst component of claim 4 wherein the proportion of electron donor contained in the resulting solid catalyst component, calculated as mol per mol of magnesium, is between about 0.05 and 5.0

6. The catalyst component of claim 5 wherein the solid catalyst component has a titanium content of from 1.5 to 4.5 percent by weight.

7. The catalyst component of claim 6 wherein the electron donor is ethyl benzoate.

8. The catalyst component of claim 7 wherein R and R' are ethoxy.

9. The catalyst component of claim 8 wherein the halohydrocarbon is chlorobenzene.

10. The catalyst component of claim 10 wherein n does not equal zero.

11. The catalyst component of claim 10 wherein R and R' are ethoxy.

12. The catalyst component of claim 11 wherein the aromatic ester is ethyl benzoate, methyl benzoate, ethyl p-methoxybenzoate or diisobutyl phthalate.

13. The catalyst of claim 12 wherein the aromatic ester is ethyl benzoate.

14. The catalyst component of claim 1 wherein Ar is dichlorophenyl.

15. The catalyst component of claim 1 wherein Ar is dimethoxyphenyl.

16. A solid catalyst component for alkene polymerization prepared by a process comprising:

(a) contacting a magnesium compound of the formula $$MgRR'.nCO_2$$

wherein R is alkoxy or aryloxy, R' is halogen, alkoxy, or aryloxy, and n is 0, with titanium tetrachloride in a halohydrocarbon diluent in the presence of an aromatic ester electron donor under conditions effective to produce a halogenated product having an atomic ratio of halogen to magnesium of at least 1.2 to 1;

(b) contacting successively said halogenated product with a halide of tetravalent titanium in a halohydrocarbon titanium content of said halogenated product;

(c) contacting the product of step (b) with TiCl$_3$—OAr where Ar is dihalophenyl or dialkoxyphenyl; and (d) recovering a solid titanium compound having a titanium content within the range of 1.5 to 4.5 percent by weight.

17. The catalyst component of claim 16 wherein R and R' are alkoxy of up to 8 carbon atoms.

18. The catalyst component of claim 17 wherein the aromatic ester is ethyl benzoate, methyl benzoate, ethyl p-methoxybenzoate or diisobutyl phthalate.

19. The catalyst component of claim 18 wherein the proportion of electron donor contained in the resulting solid catalyst component, calculated as mol per mol of magnesium, is between about 0.05 and 5.0.

20. The catalyst component of claim 19 wherein the electron donor is ethyl benzoate.

21. The catalyst component of claim 20 wherein R and R' are ethoxy.

22. The catalyst component of claim 21 wherein the halohydrocarbon is chlorobenzene.

* * * * *